Jan. 4, 1955   R. H. ARMACOST   2,698,547
DRILL BUSHING FOR CAST BLOCKS
Filed April 23, 1951

ROBERT H. ARMACOST,
INVENTOR.
HUEBNER, BEEHLER,
WORREL & HERZIG,
ATTORNEYS.

United States Patent Office 2,698,547
Patented Jan. 4, 1955

2,698,547

DRILL BUSHING FOR CAST BLOCKS

Robert H. Armacost, Los Angeles, Calif., assignor to American Drill Bushing Co., Inc., Los Angeles, Calif., a corporation of California Application April 23, 1951, Serial No. 222,499

1 Claim. (Cl. 77—62)

This invention relates to the machining arts and has particular reference to the construction of a drill block or jig wherein the material of the drill block is cast in the form needed for operation on the work at which stage of its construction the drill bushing is likewise cast in place.

Recent trends have indicated great acceptability for drill blocks of the cast variety. The ability to cast drill blocks has facilitated the construction and preparation of more or less intricate patterns for operation on correspondingly intricate forms of work. The cast drill block is of great advantage in that it can be made much more cheaply than drill blocks of material which must be machined.

In the casting of such machining devices an important factor is to provide a drill bushing so embedded in the matrix of the casting that it will maintain its position during long periods of use and wear. The very fact that drill blocks are cast suggests that the material of those blocks may be a less expensive material than previously and consequently a material more easily handled but which would be valueless as a drill block unless the drill holes were reinforced by some tough hardened material.

Moreover, by reason of the fact that bushings may be employed which are initially separate from the drill block, the bushings may readily be machined and heat treated in a special fashion in small lots if need be and thereafter applied to the drill block bringing to the drill block all of the necesssary benefits of a hard, long-wearing unit.

Although the art of making cast drill blocks with drill bushings cast in place has been practiced to some extent, many difficulties have been experienced in providing a drill bushing so constructed that it will not work loose as the device is subjected to the usual wear and tear in a machine shop. Heretofore also the particular design of drill bushing resorted to has not made it possible to practice upon it the best and most economical methods of machining and heat treating.

It is therefore among the objects of the invention to provide a new and improved drill bushing which can be used in a matrix cast to the desired form and which once in place will not work loose as a result of torque impressed upon it rotatably or thrust impressed upon it longitudinally.

Another object of the invention is to provide a new and improved drill bushing which when cast in place in a suitable matrix will not work loose under circumstances wherein the matrix in the form of a drill block is subjected to extremes of temperature, moisture and other adverse conditions.

Still another object of the invention is to provide a new and improved drill bushing so designed that there is provided on it a substantially uniform exterior giving to the drill bushing the property of maintaining its shape and physical characteristics as well as its size without distortion during the special heat treating process worked upon the drill bushing alone.

Still further among the objects of the invention is to provide a drill bushing incorporating an exterior such that it presents substantially a maximum amount of surface or contact with the matrix in which it is cast and also presenting surfaces facing in a sufficient number of different directions so that a maximum amount of resistance will be supplied at all times to stresses and strains placed upon the drill bushing when in place in the drill block.

Included also in the objects of the invention is to provide a new and improved drill bushing which is relatively inexpensive to manufacture from the point of view of labor operations and also one wherein the amount of material is reduced substantially to a minimum especially as compared to drill bushings having hexagonal exteriors, thereby minimizing the amount of relatively high priced materials which are most advantageous for use as guides for a drill.

With these and other objects in view, the invention consists in the construction, arrangement and combination of the various parts of the device whereby the objects contemplated are attained as hereinafter set forth, pointed out in the appended claim and illustrated in the accompanying drawings.

Figure 1:
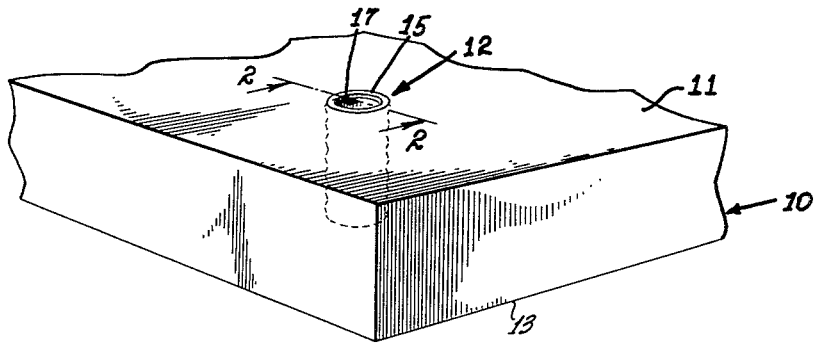
Fig. 1 is a fragmentary section showing one corner of a drill block with the drill bushing of the invention placed therein.

Materials selected for the most part for use as a drill block are those wherein the coefficient of expansion or contraction is relatively low. Even so, however, although this coefficient may be kept as low as possible, there is always likely to be some measure of expansion or contraction, the result of which is to make difficult the setting of a drill bushing in the casting in such fashion that it will not work loose. Practical limitations in the characteristics of the matrix or cast material has made advisable the construction of a drill bushing with such an exterior that, in spite of the lack of suitable characteristics in the matrix, the character of the exterior of the drill bushing will compensate for those deficiencies and still result in a tight joint between the drill bushing and the drill block.

As illustrated in an embodiment selected to show the invention there is provided a drill block indicated generally by the reference character 10 having a top face 11 and a bottom face 13. This drill block may be made of any one of a number of different materials, one being known commercially as a cerro matrix. Many other suitable matrixes or casting material may be successfully employed. In using a material of this kind from which to construct drill blocks, it becomes advisable to cast in its proper position the one or more drill bushings which will be needed for guiding drills through the drill block to the work.

Figure 2:
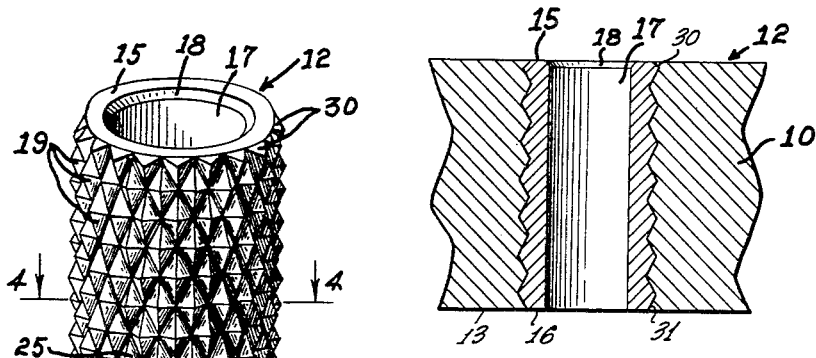
Figure 2 is a fragmentary longitudinal sectional view taken on the line 2—2 of Figure 1.
Figure 3:
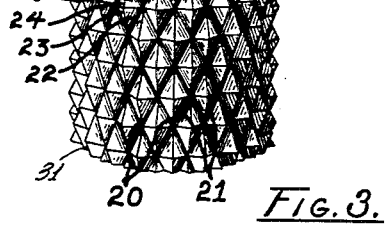
Figure 3 is an elevational perspective view of the drill bushing of the invention.
Figure 4:
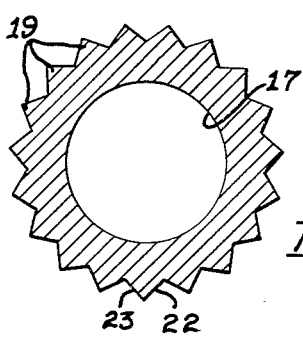
Figure 4 is a cross sectional view of the drill bushing taken on the line 4—4 of Figure 3.

As illustrated one such drill bushing 12 is shown in position in the drill block 10 of Figure 1. The position is also clearly illustrated by the fragmentary sectional view of Figure 2. The particular form of the drill bushing 12 is shown in Figures 3 and 4. The drill bushing includes a body having an upper flat end 15 and a lower flat end 16, shown in Figure 2. The body also has a smooth walled cylindrical interior 17 comprising a bore for reception of a drill. At the outer end of the cylindrical interior is an annular beveled portion 18 adapted to guide insertion of the point of a drill into the interior.

The exterior of the body of the drill bushing is illustrated as being provided with a diamond-like pattern, this diamond-like pattern comprising interlacing of diamond-shaped studs 19. The diamond-shaped studs may be described as being positioned in circular rows about the exterior of the body of the drill bushing alternately spaced so that downwardly extending apexes 20 of one row of diamond-shaped studs fall between sides 21 of the studs of the next lower row, and so on throughout the entire exterior surface of the body.

It will be noted that the studs are diamond-shaped at the bases and are herein shown as having the diagonal dimension which extends vertically slightly longer than the diagonal dimension which extends laterally. As shown, the studs are uniform in height from the base to the apex and uniform in size and configuration. Also it will be noted that there is substantially a greater distance between the bases of the apexes and the smooth walled cylindrical interior 17 than the height of the studs as will become apparent from an examination of Figure 4. It will also become apparent from an examination of Figures 3 and 4 that lateral faces 22, 23, 24 and 25 of each stud face in as many different directions. Moreover, they face diagonally with respect to the direction of a torque which might be applied to the drill bushing and with respect to an end thrust. It will further be noted that at the upper end of the drill bushing the endmost studs are beveled as indicated at 30 and there is a somewhat similar bevel 31 applied at the opposite end.

When constructing a drill block employing a drill bushing of the type herein described, the drill bushings may be set in the mold on suitable pegs spaced at proper intervals for the job desired. The matrix comprising the drill block may then be poured around the drill bushings and clearance holes 35 properly cored. As the matrix solidifies, the material of the matrix finds its way into all of the hollows between the diamond shaped studs and engages in surface contact with all of the faces of the studs in an interlocking relationship. No temperature conditions other than room temperature are needed. A particularly tenacious grip is thus established on the drill bushing. By reason of the provision of beveled ends 30 the material of the matrix is brought smoothly over the outer end of the drill bushing level with the end 15.

With the material of the drill block in intimate contact as described, the intimate contact will not be materially disturbed even though there may be some shrinkage or expansion of the material of the matrix.

After the matrix has solidified in the form of the block 10, the block with the drill bushing embedded in it is ready for use. In use the drill bushing is so thoroughly embedded in the material of the block that as torque may be exerted on the drill bushing and the force of the rotating drill bit imparted rotationally to the drill bushing, there will be sufficient resistance to that torque offered by the contact of a great many faces of the diamond-shaped studs to the material of the drill block so that the anchored position of the drill bushing in the drill block will not be disturbed. Correspondingly, should a drill strike the outside end of the drill bushing as, for example, the end 15 or the bevel 18, the thrust of the impact will not dislodge the position of the drill bushing in the drill block even under circumstances where the clearance hole 35 might be of a substantially larger diameter than illustrated in Figure 2.

Figure 5:
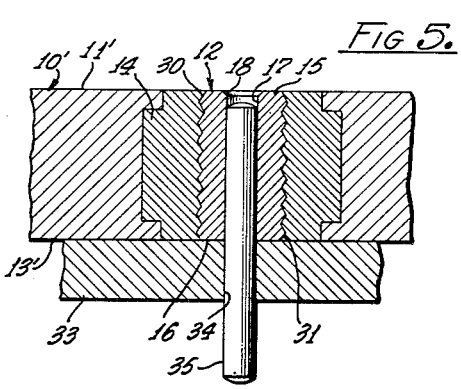
Figure 5 is a longitudinal sectional view of the drill bushing showing another typical means of application of the bushing to a drill block.

In Figure 5 the drill bushing 12 is shown applied to a typical drill block 10' by use of a matrix 14. In this instance a hole is located only approximately in the block 10' and is made to a diameter substantially larger than the diameter of the bushing. The bushing may then be located by use of a pin 35 in a hole 34 of the plate 33 and while thus spotted accurately in position, the matrix may be poured. The plate 33 may be clamped against a bottom face 13' of the block and form thereon the bottom face of the matrix. The top face may be leveled off flush with a top face 11' of the block.

The drill bushing as herein described, being of a symmetrical design, tends to avoid distortion in the drill bushing itself when the necessary heat treating operation is performed upon it. The fact that the bushing can be made up of round stock rather than hexagonal stock effects a material saving in manufacturing costs and the amount of material necessary to be used.

Although the drill bushing has been described as applied to a drill block wherein the entire block is cast at one time, it will be appreciated that in the event holes in the drill block might be incorrectly located, the holes may under certain circumstances where the material of the drill block is such be bored out larger and the drill bushing reset in correct location by pouring a quantity of the same or comparable plastic matrix in the hole around the exterior of the drill bushing. The drill bushing herein described is especially advantageous for locating drill holes in irregular jigs.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

A drill jig comprising the combination of a drill block and a substantially cylindrical drill bushing, said drill block comprising a mass material having an aperture therethrough exceeding in diameter the outermost diameter of the drill bushing and centered substantially at the desired location of the drill bushing, said drill bushing comprising a body uniformly cylindrical throughout its length and having a smooth-walled cylindrical drill receiving bore of precision tolerance therethrough adapted to receive and guide a rotating drill bit, a tapered inlet to said cylindrical bore at one end, said drill bushing having a roughened exterior of broad tolerance comprising rows of diamond-shaped studs uniformly distributed throughout the entire roughened exterior alternating with diamond-shaped studs of other rows so that studs of each row fit between studs in the next adjacent row throughout the entire circumference, each stud having four angular sides terminating in a radially outwardly pointing apex, and a plastic matrix subject to initial molding operation, said plastic matrix solidifying at normal room temperatures to a hard tough consistency between the interior wall of said aperture and the roughened exterior of the drill bushing whereby the plastic matrix interlocks between said diamond-shaped studs and the drill bushing, and whereby the drill bushing is secured and anchored in the matrix and the drill block against both axial and rotational displacement.

References Cited in the file of this patent

UNITED STATES PATENTS

| | | |
|---|---|---|
| 1,416,117 | Muir | May 16, 1922 |
| 2,058,298 | Chesley | Oct. 20, 1936 |
| 2,392,804 | Basolo | Jan. 15, 1946 |

FOREIGN PATENTS

| | | |
|---|---|---|
| 508,294 | Great Britain | June 28, 1939 |